US007386295B2

(12) United States Patent
Alloune et al.

(10) Patent No.: US 7,386,295 B2
(45) Date of Patent: *Jun. 10, 2008

(54) COMMUNICATION BILLING SYSTEM

(75) Inventors: Kathleen E. Alloune, Irving, TX (US); Jeffrey L. Benoist, Flower Mound, TX (US); Mark D. Carter, Frisco, TX (US); Robert W. Ganter, Mesquite, TX (US); Gretchen L. Knapp, Grapevine, TX (US); Joseph G. Laura, Plano, TX (US); Mark S. McKee, Coppell, TX (US); Scott F. Mitchell, Dallas, TX (US); Charles A. Paelinck, Coppell, TX (US); Angela L. Seefeldt, Edmond, OK (US); James D. Williams, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 815 days.

This patent is subject to a terminal disclaimer.

(21) Appl. No.: 10/447,549

(22) Filed: May 29, 2003

(65) Prior Publication Data

US 2003/0212634 A1 Nov. 13, 2003

Related U.S. Application Data

(63) Continuation of application No. 09/560,423, filed on Apr. 27, 2000, now Pat. No. 6,615,034.

(51) Int. Cl.
| H04Q 7/20 | (2006.01) |
| H04M 15/00 | (2006.01) |
| G07F 19/00 | (2006.01) |
| G06Q 40/00 | (2006.01) |

(52) U.S. Cl. .................... 455/406; 455/405; 455/414.1; 379/121.01; 379/144.01; 705/34; 705/40

(58) Field of Classification Search ................ 455/405, 455/406, 408; 379/114.03, 114.1, 121.02, 379/126; 705/34, 40, 29, 32
See application file for complete search history.

(56) References Cited

U.S. PATENT DOCUMENTS

| 5,003,584 | A | | 3/1991 | Benyacar et al. |
| 5,353,331 | A | | 10/1994 | Emery et al. |
| 5,771,282 | A | | 6/1998 | Friedes |
| 5,793,853 | A | | 8/1998 | Sbisa |
| 5,844,972 | A | | 12/1998 | Jagadish et al. |
| 5,905,736 | A | | 5/1999 | Ronen et al. |
| 5,991,616 | A | | 11/1999 | Mirza et al. |
| 6,064,666 | A | | 5/2000 | Willner et al. |
| 6,173,171 | B1 | * | 1/2001 | Plush et al. .................. 455/408 |
| 6,266,401 | B1 | | 7/2001 | Marchbanks et al. |
| 6,532,282 | B1 | * | 3/2003 | Plush et al. ............ 379/114.03 |
| 6,614,781 | B1 | * | 9/2003 | Elliott et al. ................. 370/352 |
| 6,615,034 | B1 | | 9/2003 | Alloune et al. |
| 2001/0056362 | A1 | * | 12/2001 | Hanagan et al. ................. 705/7 |
| 2002/0033416 | A1 | * | 3/2002 | Gerszberg et al. ........... 235/380 |
| 2004/0133487 | A1 | * | 7/2004 | Hanagan et al. ................ 705/34 |
| 2004/0224661 | A1 | * | 11/2004 | Pericas et al. ................ 455/406 |

FOREIGN PATENT DOCUMENTS

| GB | 2332337 A | 6/1999 |
| WO | WO95/24094 | 9/1995 |

OTHER PUBLICATIONS

Publication Article, unknown author, "AT&T throws wireless/wireline bundle at competition", Mobile Phone News, Feb. 1999, @ 1999 Phillips Publishing International, Inc.*
Publication Article, unkown author, "AT&T writes new strategies in wireless—interview with AT&T wireless CEO Dan Hesse, part 3—Interview", Mobile Phone News, Aug. 1999, @ 1999 Phillips Publishing International, Inc.*
Internet Article, unknown author, ("FlexTime Market Tests", Sprint Tariff F.C.C. No. 1, section 6.93.61), Jul. 31, 2001, www.sprint.com.*
Publication Article, unkown author, "Cbeyond Intros Wireless", Light reading, Optical Network, Jan. 2006.*
Thames, Gerald W., "Syncordia's Billing Service," Communications Engineering, vol. 11, Jan. 1993, XP 000395678, pp. 241-245.

Maunder, Andrew, "Dawn of a New Era in Billing Systems: The Information Age," Annual Review of Communications, 1997, XP-000720972, pp. 1067-1071.

* cited by examiner

*Primary Examiner*—Duc M. Nguyen

(57) ABSTRACT

A communication billing system comprising a processing system coupled to an interface system. The processing system is configured to process a plurality of wireless service events from a wireless system together at the event level with a plurality of wireline service events from a wireline system to generate total charge records for a plurality of wireless services and a plurality of wireline services. The processing system is also configured to process the total charge records for the plurality of wireless services and the plurality of wireline services to generate a customer bill. The interface system is configured to receive the plurality of wireless service events from the wireless system, receive the plurality of wireline service events from the wireline system, and transmit the customer bill for the processing system.

16 Claims, 5 Drawing Sheets

COMMUNICATION BILLING SYSTEM

RELATED APPLICATIONS

This application is a continuation of prior application Ser. No. 09/560,423, filed on Apr. 27, 2000, now U.S. Pat. No. 6,615,034 and that is hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication networks, and specifically, to a communication billing system that provides interrelated processing of wireless service events and wireline service events to produce a customer bill.

2. Description of the Prior Art

The development of advanced communication networks has taken on critical importance with the dramatic rise in consumer demand for additional services. Examples of these services include high quality voice, data, and video communications. These services are provided over both wireless and wired mediums and may be provided across one or multiple networks. For billing purposes, each service includes an individual communication billing system associated with the service to process service events and generate total charge records that represents a total billing charge for the respective service. The service events are generated by the system providing the individual service and represent an individual usage of the service. The total charge records from each billing system are provided to a total integration system that integrates the total charge records for each service subscribed to by a customer onto a single customer bill.

FIG. 1 illustrates an example of a communication billing system for a customer subscribing to a wireline service and a wireless service. On FIG. 1, wireline service events 113 are generated by the wireline system 111 for each individual usage of the wireline service during the course of a billing period. The wireline service events 113 are provided to a wireline billing system 101 by the wireline system 111. The wireline service events 113 are received in a wireline interface 104 and stored in a wireline processor 103 during the billing period. At the termination of the billing period, the wireline processor 103 totals all of the wireline service events 113, applies customer discounts, minimum service charges, taxes, and other promotional discounts or charges to generate a total charge record 115 for the wireline service. The wireline processor 103 provides total wireline charge record 115 to the total integration system 100.

Substantially concurrently, wireless service events 114 are generated by the wireless system 112 for each individual usage of the wireless service during the course of the billing period. The wireless service events 114 are provided to a wireless billing system 102 by the wireless system 112. The wireless service events 114 are received in a wireless interface 106 and stored in a wireless processor 105 during the billing period. At the termination of the billing period, the wireless processor 105 totals all of the wireless service events 114, applies customer discounts, minimum service charges, taxes, and other promotional discounts or charges to generate a total wireless charge record 116 for the wireless service. The wireless processor 105 provides the total wireless charge record 116 to the total integration system 100.

The total integration system 100 integrates the total wireline charge record 115 and the total wireless charge record 116 onto a single customer bill 107. Unfortunately, as new services are provided, additional billing systems are required to process service events generated by the new service. Therefore, a need exists in the art for a billing system that processes service events regardless of the source (wireless or wireline) at the event level to generate total charge records for each service that can be integrated onto the customer bill.

SUMMARY OF THE INVENTION

The present invention advances the art by providing a single communication billing system that provides interrelated processing at the event level of wireless service events and wireline service events to generate total wireless charge records and total wireline charge records for each wireless and wireline service subscribed to by the customer. In the context of the present invention a service event is defined as an individual usage of a communication service, wherein examples of a communication service include but are not limited to, telephone calls, data calls, audio transfers, video transfers, e-mail sessions, voice mail sessions, video mail sessions, web sessions, and/or other similar services provided over a communication network. These services could be provided over a wireless or wired medium and over one or multiple communication networks.

A first advantage of the present communication billing system is that new services are provided without the addition of new billing systems. A second advantage of the present communication billing system is that network size is reduced, as individual billing systems are not required to process service events from different services. A third advantage of the present communication billing system is that the event level processing of service events from multiple services provides for seamless integration of enhanced billing services such as cross-contribution. A fourth advantage of the present communication billing system is that mailing costs are reduced by the integration of charge records from multiple invoices into a single invoice. A fifth advantage of the present communication billing system is that only one account receivable is required for the integrated single invoice. A sixth advantage of the present communication billing system is that the integrated single invoice reduces a customer's administrative costs because only a single payment is required for all services. In the context of this application cross-contribution is the application of unused service minutes as a credit across multiple services.

The communication billing system is comprised of a processing system coupled to an interface system. The processing system is configured to process a plurality of wireless service events from a wireless system together at the event level with a plurality of wireline service events from a wireline system to generate total charge records for a plurality of wireless services and a plurality wireline services. The processing system is also configured to generate a customer bill based on the total charge records for the plurality of wireless services and the plurality of wireline services. The interface system is configured to receive the plurality of wireless service events from the wireless system, receive the plurality of wireline service events from the wireline system, and transmit the customer bill for the processing system.

DETAILED DESCRIPTION OF THE PREFERRED EMBODIMENT

Figure 1:
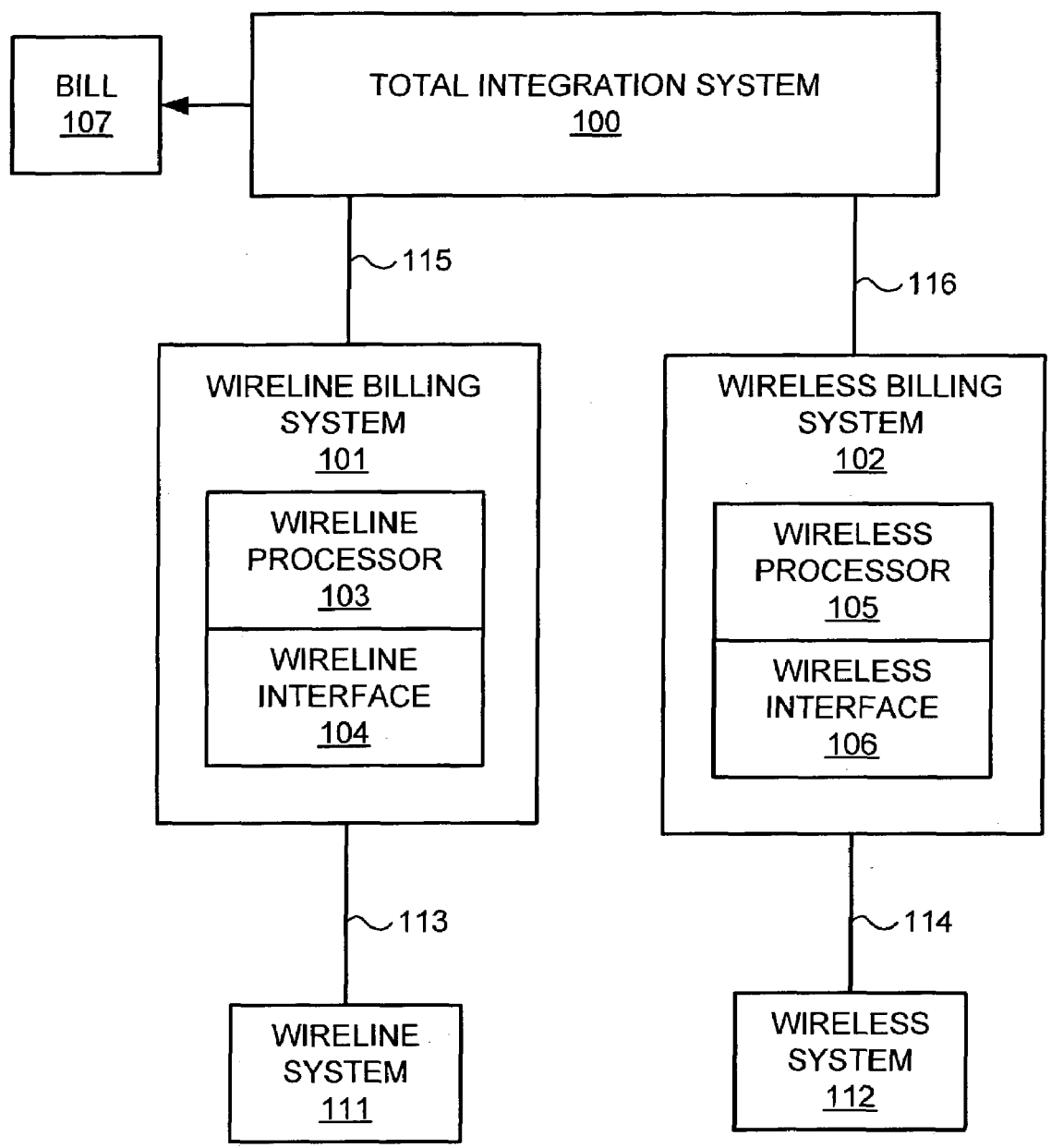
FIG. 1 illustrates an example of prior art communication billing systems.
Figure 2:
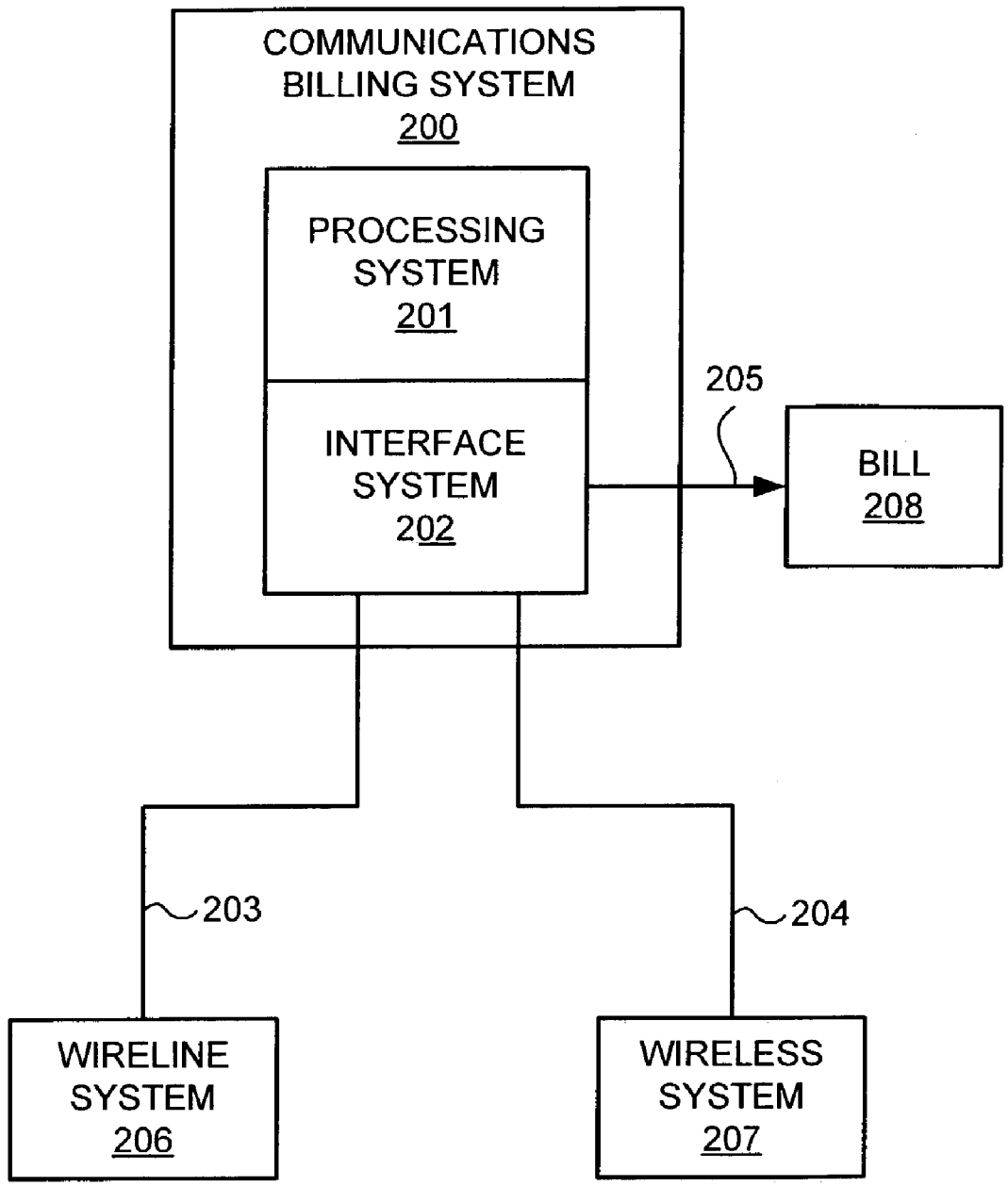
FIG. 2 illustrates an example of a communication billing system according to the present invention.
Figure 3:
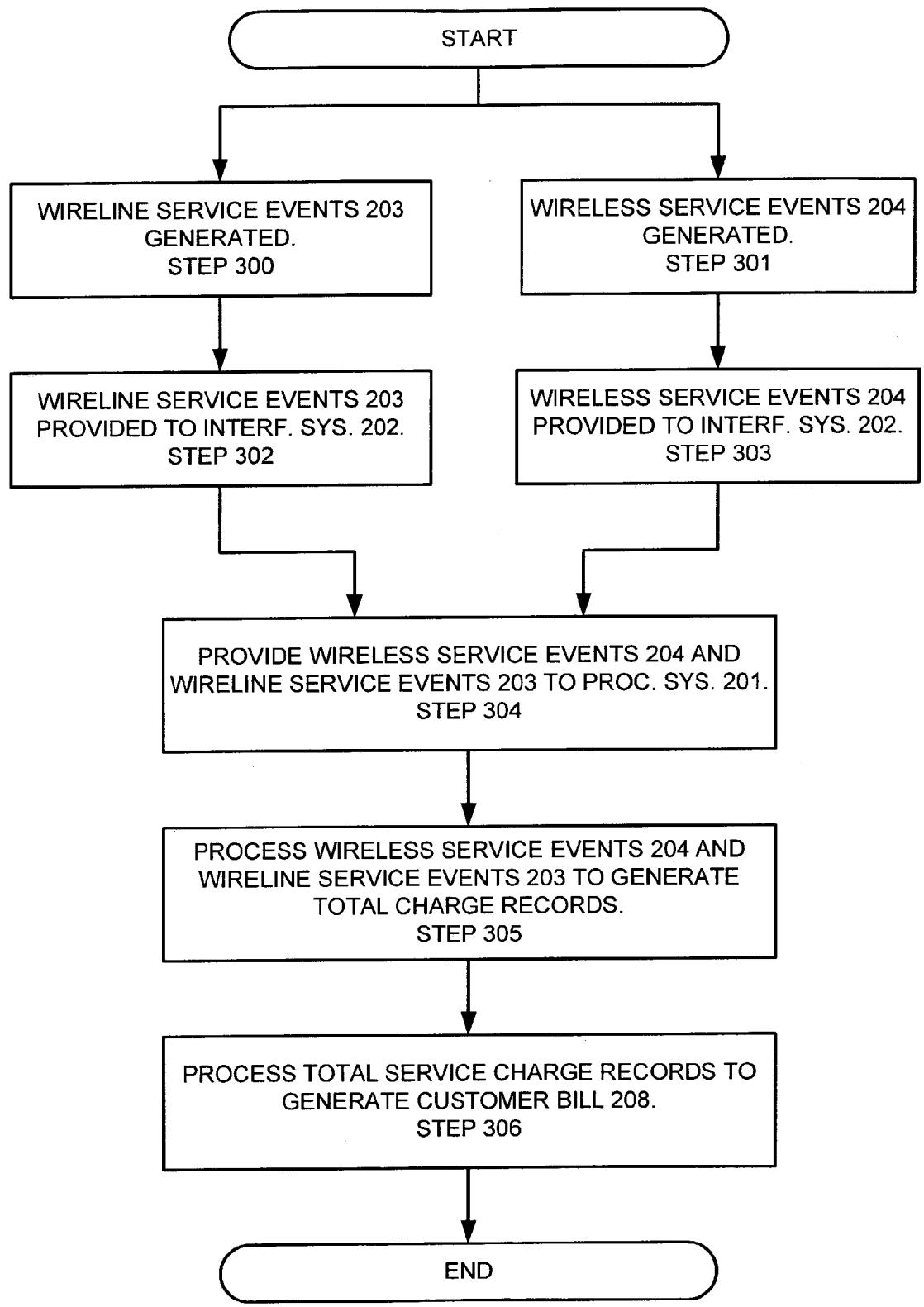
FIG. 3 illustrates an example the operation of a communication billing system according to the present invention.

Communication Billing System Configuration and Operation FIGS. 2-3:

FIG. 2 depicts an example of a communication billing system 200 according to the present invention. The communication billing system 200 comprises a processing system 201 coupled to an interface system 202. The interface system 202 is connected to a wireline system 206 and a wireless system 207. Those skilled in the art will appreciate that the wireline system 206 could provide various conventional wireline services to customers and the wireless system 207 could provide various conventional wireless services to customers. Some examples of the wireline services and the wireless services include but are not limited to, video, data, and voice communications.

The processing system 201 could be any processing system capable of processing a plurality of wireless service events 204 from wireless system 207 together at the event level with a plurality of wireline service events 203 from wireline system 206 to generate total wireless charge records for a plurality of wireless services provided by wireless system 207 and generate total wireline charge records for a plurality of wireline services provided by wireline system 206. The processing system 201 is also configured to generate the customer bill 208 based on the total wireline charge records and total wireless charge records. In some examples of the present invention, the processing system 201 could also be configured to provide the customer bill to the customer.

In the context of this application, processing together at the event level is defined as receiving individual wireless service events representative of individual customer usage of wireless services, receiving individual wireline service events representative of individual customer usage of wireline services, and processing the individual wireless and wireline service events together to generate: 1) total wireless charge records for each of the wireless services, 2) total wireline charge records for each of the wireline services, and/or 3) a total charge record representative of a total charge for all of the wireline and wireless services. Processing together at the event level could also include generating a total wireline charge record representative of the summation of the total wireline charge records for each of the wireline services and generating a total wireless charge record representative of the summation of the total wireless charge records for each of the wireless services.

The interface system 202 could be any interface system capable of receiving the plurality of wireless service events 204 from the wireless system 207, receive the plurality of wireline service events 203 from the wireline system 206, provide the wireless service events 204 and wireline service events 203 to the processing system 201, and provide the customer bill 208 over communication path 205.

FIG. 3 is a flowchart illustrating an example of the operation of the communication billing system 200. Referring to FIGS. 2-3, wireline service events 203 are generated by the wireline system 206 for each individual usage of a wireline service by customers at step 300. Wireless service events 204 are generated by the wireless system 207 for each individual usage of a wireless service by customers at step 301. The wireline system 206 provides the wireline service events 203 to the interface system 202 at step 302. The wireless system 207 provides the wireless service events 204 to the interface system 202 at step 303. The interface system 202 provides the wireline service events 203 and the wireless service events 204 to the processing system 201 at step 304.

At the end of an individual customer's billing period, the processing system 201 processes the wireline service events 203 associated with the customer, together with the wireless service events 204 associated with the customer, to generate total wireline and total wireless charge records for the individual wireline and wireless services subscribed to by the customer at step 305. At step 306, the processing system 201 processes the total wireline charge records and the total wireless charge records to generate the customer bill 208 for the customer. In some examples of the invention, the processing system 201 could also be configured to provide the customer bill 208 to the customer. The customer bill 208 could be provided electronically or in a paper format.

Figure 4:
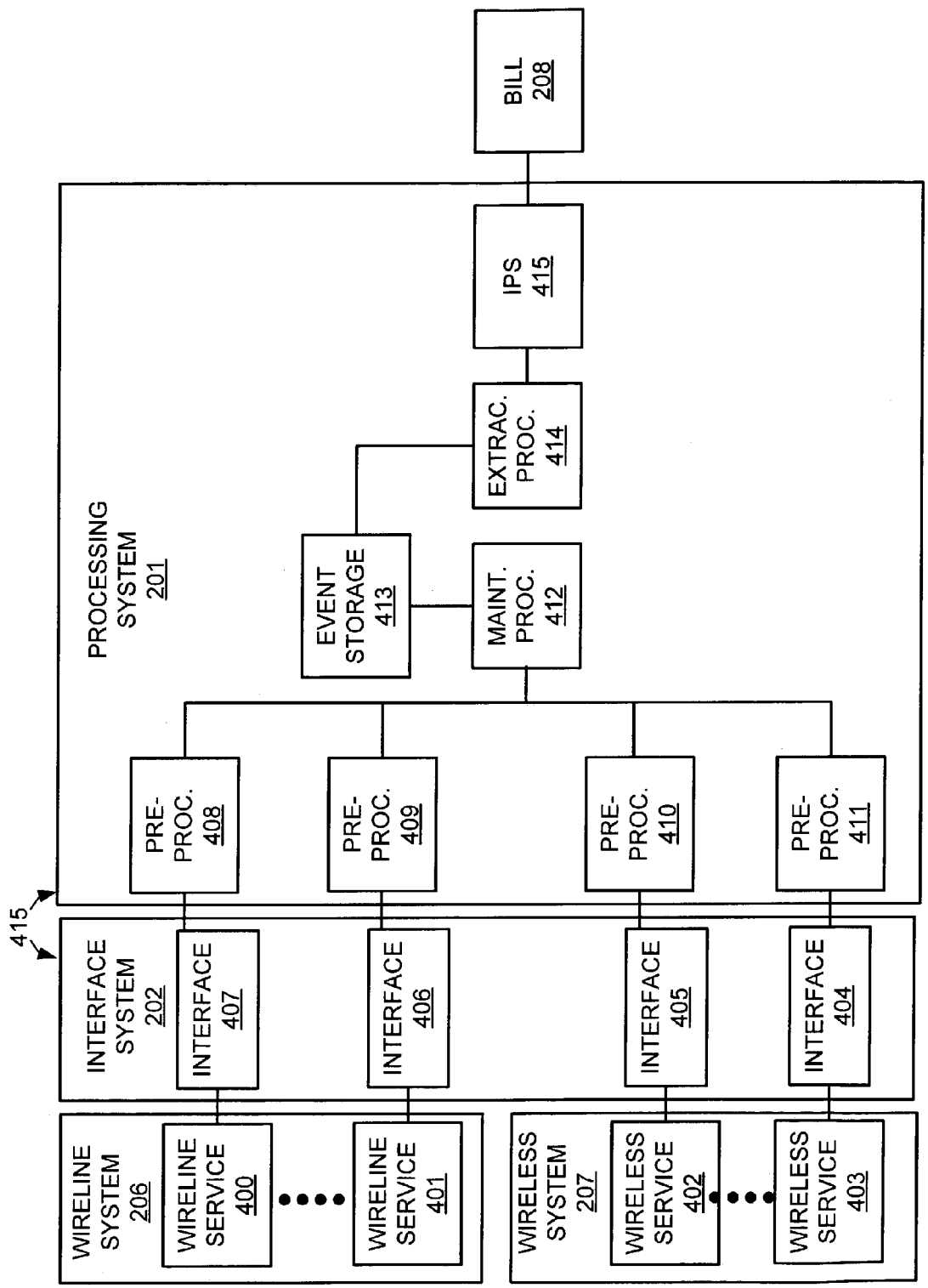
FIG. 4 illustrates another example of a communication billing system according to the present invention.
Figure 5:
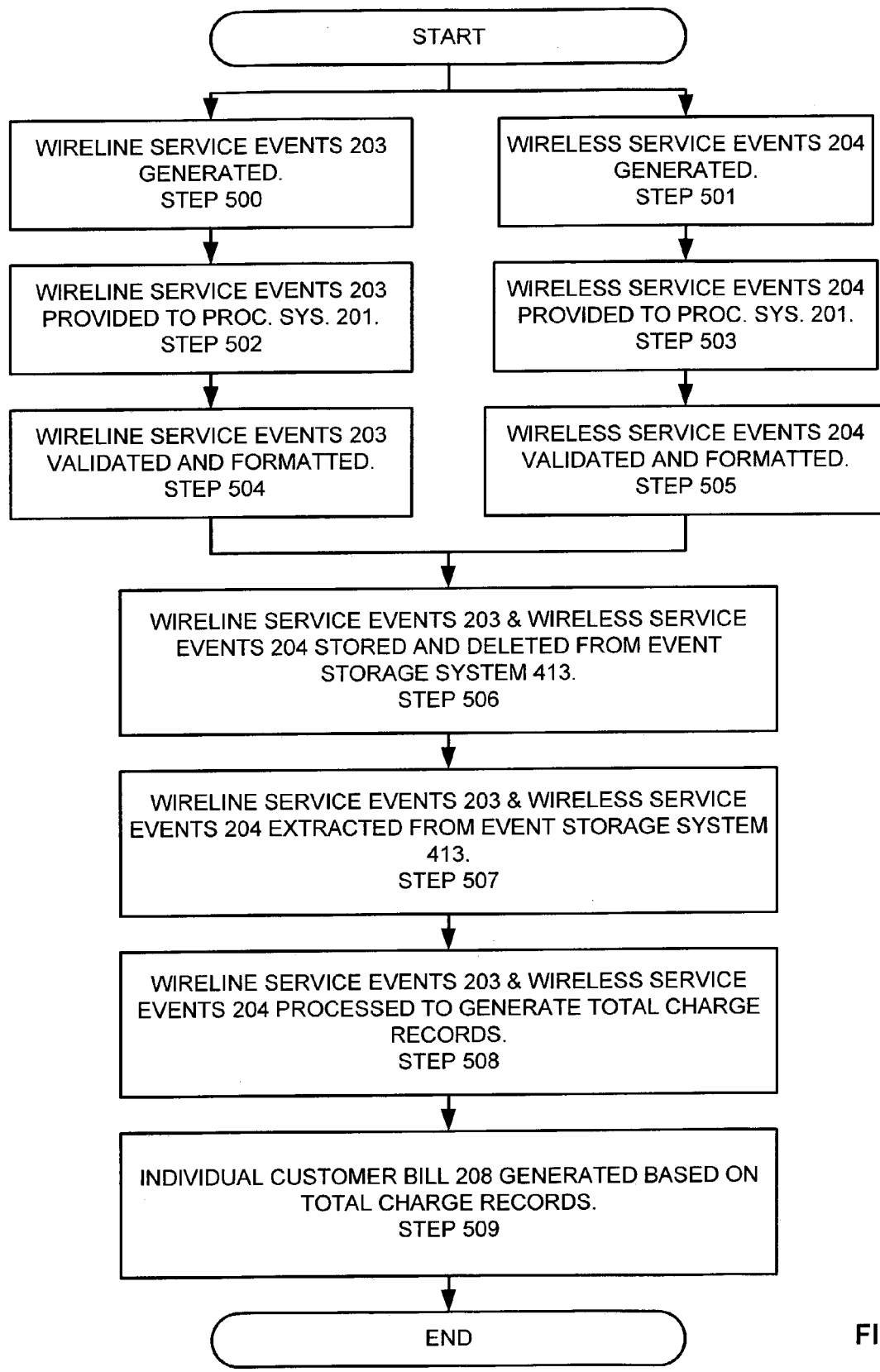
FIG. 5 illustrates another example of the operation of a communication billing system according to the present invention.

Communication Billing Processing System FIGS. 4-5:

FIG. 4 illustrates another embodiment of a communications billing system in an example of the present invention. Those skilled in the art will appreciate numerous variations that do not depart from the present invention. Those skilled in the art will also appreciate that various features described below could be combined with the above described embodiment to form multiple variations of the invention.

FIG. 4 depicts the wireline system 206, the wireless system 207, the communication billing system 415, and the customer bill 208. The communication billing system 415 comprises the interface system 202, and the processing system 201. The wireline system 206 is comprised of wireline services 400 and 401. The wireless system 207 is comprised of wireless services 402 and 403. Those skilled in the art will appreciate that the wireline system 206 and the wireless system 207 could include numerous such services although only wireline services 400 and 401 and wireless services 402 and 403 are shown for clarity.

The interface system 202 is comprised of interfaces 404, 405, 406, and 407. The processing system 201 is comprised of pre-processors 408, 409, 410, and 411, a maintenance processor 412, an event storage system 413, an extraction processor 414, and an invoice processing system (IPS) 415. The event storage system 413 is connected to the extraction processor 414 and the maintenance processor 412. The extraction processor 414 is connected to the IPS 415. The maintenance processor 412 is connected to the pre-processors 408, 409, 410, and 411. The interface 407 is connected to the pre-processor 408 and the wireline service 400. The interface 406 is connected to the pre-processor 409 and the wireline service 401. The interface 405 is connected to the pre-processor 410 and the wireless service 402. The interface 404 is connected to the pre-processor 411 and the wireless service 403.

The interface 407 could be any interface system capable of receiving a plurality of wireline service events from the wireline service 400 and providing those wireline service events to the pre-processor 408. The interface 406 could be any interface system capable of receiving a plurality of wireline service events from the wireline service 401 and providing those wireline service events to the pre-processor 409. The interface 405 could be any interface system capable of receiving a plurality of wireless service events from the wireless service 402 and providing those wireless service events to the pre-processor 410. The interface 404 could be any interface system capable of receiving a plurality of wireless service events from the wireless service 403 and providing those wireless service events to the pre-processor 411.

The pre-processor 408 could be any processing system capable of receiving the plurality of wireline service events from the interface 407 and processing each of the plurality of wireline service invents to format the service events and validate the service events. The pre-processor 408 provides the formatted and validated service events to the maintenance processor 412. The pre-processor 409 could be any processing system capable of receiving the plurality of wireline service events from the interface 406 and processing each of the plurality of wireline service invents to format the service events and validate the service events. The pre-processor 409 provides the formatted and validated service events to the maintenance processor 412. The pre-processor 410 could be any processing system capable of receiving the plurality of wireless service events from the interface 405 and processing each of the plurality of wireless service invents to format the service events and validate the service events. The pre-processor 410 provides the formatted and validated service events to the maintenance processor 412. The pre-processor 411 could be any processing system capable of receiving the plurality of wireless service events from the interface 404 and processing each of the plurality of wireless service events to format the service events and validate the service events. The pre-processor 411 provides the formatted and validated service events to the maintenance processor 412.

Formatting the service events could include operations such as formatting each wireline and wireless service event into a common form for further processing. Formatting the service events could also include associating the service events with an individual customer. One example of associating a service event could be adding a unique customer identification to the service event. The customer identification could be assigned by the pre-processors 408, 409, 410, and 411, the wireless system 207, the wireline system 206 or received from an outside source such as a customer information database.

Validating the service events could include operations such as verifying the accuracy and integrity of the data in the service event and/or verifying that a complete event record is received. If errors are detected in the data, the pre-processors 408, 409, 410, and 411 could make edits. If the errors cannot be corrected, the service event could be rejected and reporting information generated by the pre-processors 408, 409, 410, and 411 to alert system administrators of the error.

The maintenance processor 412 could be any processing system capable of receiving the plurality of wireline service events and the plurality of wireless service events from the pre-processors 408, 409, 410, and 411. The maintenance processor 412 adds the plurality of wireline service events and the plurality of wireless service events to the event storage system 413. As will become apparent from the following description, the maintenance processor 412 also removes the wireline service events and the wireless service events from the event storage system 413 after generation of the customer bill 208.

The extraction processor 414 could be any processor capable of determining a customer's billing period and extracting wireline service events and wireless service events from event storage system 413 associated with the customer. The extraction processor 414 extracts the wireline service events and wireless service events for services subscribed to by the customer and generated during the customer's billing period. For example, if the customer subscribes to wireline service 400, wireline service 401, and wireless service 403, the extraction processor 414 extracts all of the wireline service events from wireline service 400 associated with the customer at the end of the customers billing period. The extraction processor 414 also extracts all of the wireline service events from wireline service 401 associated with the customer and extracts all of the wireless service events from wireless service 403 associated with the customer at the end of the billing period. The extraction processor 414 provides the extracted wireline and wireless service events to the IPS 415.

The IPS 415 could be any processing system capable of processing the wireline service events and wireless service events to generate a total charge record for each of the wireline services 400 and 401 and the wireless services 402 and 403 subscribed to by the customer. The IPS 415 processes the total charge records to generate the customer bill 208. Continuing with the above example, the IPS 415 processes the extracted wireline service events and wireless service events to: 1) generate a total wireline charge record for the wireline service 400, 2) generate a total wireline charge record for the wireline service 401, and 3) generate a total wireless charge record for the wireless service 403. The IPS 415 then generates a customer bill 208 based on the total wireline charge record for the wireline service 400, the total wireline charge record for the wireline service 401, and the total wireless charge record for the wireless service 403.

The event storage system 413 could be any storage system capable of storing the plurality of wireline service events and the plurality of wireless service events received from the wireline system 206 and the wireless system 207. Advantageously, the event storage system 413 provides a common storage repository for all of the wireless service events from wireless services 402 and 403 and the wireline service events from the wireline services 400 and 401. Thus, the communication billing system 415, using event storage system 413, extraction processor 414, and IPS 415, can generate the customer bill 208 for any customer regardless of services subscribed to by the customer.

FIG. 5 illustrates the operational steps of the communication billing system 415. Referring to FIGS. 4 and 5 wireline service events are generated by individual usage of wireline services 400 and 401 at step 500. The wireline service events are provided to the processing system 201 by the wireline system 206 via the interface system 202 at step 502. For example, wireline service events from the wireline service 400 are provided to the interface 407 and provided by the interface 407 to the pre-processor 408. Wireline service events from the wireline service 401 are provided to the interface 406 and provided by the interface 406 to the pre-processor 409.

Substantially concurrently, wireless service events are generated by individual usage of wireless services 402 and 403 at step 501. The wireless service events are provided to the processing system 201 by the wireless system 207 via the interface system 202 at step 503. For example, wireless service events from the wireless service 402 are provided to the interface 405 and provided by the interface 405 to the pre-processor 410. Wireless service events from the wireless service 403 are provided to the interface 404 and provided by the interface 404 to the pre-processor 411.

The pre-processors 408 and 409 validate and format each of the wireline service events received from the interfaces 407 and 406 and provide the formatted and validated wireline service events to the maintenance processor 412 at step 504. The pre-processors 410 and 411 validate and format each of the wireless service events received from the interfaces 405 and 404 and provide the formatted and validated wireless service events to the maintenance processor 412 at step 505.

The maintenance processor 412 stores the wireline service events and the wireless service events in the event storage system 413 at step 506. The maintenance processor 412 also deletes old wireline and wireless service events which have been processed into a customer bill 208 at step 506. In some examples of the invention, the maintenance processor 412 also generates reporting information. The reporting information could include information such as the capacity status of the event storage system 413, information on wireline and wireless service events stored or deleted from the event storage system 413, and/or information on wireline and wireless service events received from the pre-processors 408, 409, 410, and 411.

The event storage system 413 stores the wireline and wireless service events during the course of the billing period. As billing periods terminate for individual customers, extraction processor 414 extracts all of the wireline and wireless service events associated with the individual customer and the billing period at step 507. The extraction could be based on any suitable method with one example being by the customer identification associated with each individual customer. The extraction processor 414 provides the extracted service events to the IPS 415.

The IPS 415 processes the extracted wireline and wireless service events associated with the customer to generate total wireless and wireline charge records for each service, e.g. 400, 401, 402, and 403, subscribed to by the customer at step 508. The IPS 415 could also process the total wireless charge records for each wireless service e.g. 402 and 403 to generate a total wireless charge record representative of the total charge for wireless services. The IPS 415 could also process the total wireline charge records for each wireline service e.g. 400 and 401 to generate a total wireline charge record representative of the total charge for wireline services.

Processing of the extracted wireline and wireless service events could include without limitation, determination and application of discounts. The discounts could be based on the call volume, usage of an individual service or usage of multiple services during the billing period. The discounts could be based on a promotional event sponsored by the service provider. Examples of promotional events could include holiday discounts or new service discounts. The discounts could also be based on the aggregation of all service usage from multiple customer locations or be awarded based on a threshold. An example of aggregation discounting could include a discount for the total service usage across multiple offices for a business customer. An example of threshold discounting could include a first discount for meeting a minimum service usage and a second discount for meeting a higher service usage for a particular service or group of services. The processing of the extracted wireline and wireless service events could also include determination and application of pro-rating. An example of pro-rating could include determination of a time period where unused services pre-purchased by the customer are credited to the customer's bill.

The processing of the extracted wireline and wireless service events could also include a determination and application of a cross-contribution. Cross contribution comprises bundling of service minutes across multiple communication services. One example of cross-contribution could include the application of a credit for unused wireline service minutes to the total charge record for a wireless service. Another example of cross-contribution could include the application of a credit for unused wireless service minutes to the total charge record for wireline service. For example, a customer with a 500 minute wireless service plan could use 420 minutes during the billing period. The IPS 415 could include the 420 minutes in the total charge record for the customer's wireless service and apply the 80 unused minutes as a credit or contribution toward the customer's total charge record for a wireline service, such as residential long distance. The processing of the extracted wireline and wireless service events could also include determination and application taxes, minimum service charges, and other base charges associated with the service.

At step 509 IPS 415 processes the total charge records for the individual customer to generate a customer bill 208. The customer bill 208 could be provided directly to the customer either electronically or in a paper format. The customer bill 208 could also be provided to other systems including but not limited to, an auditing system.

The above-described systems include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

We claim:

1. A method of operating a communication billing system, the method comprising:
   receiving a plurality of wireless service events from a wireless system;
   receiving a plurality of wireline service events from a wireline system; and
   processing the plurality of wireless service events and the plurality of wireline service events together to apply a cross-contribution, wherein the cross-contribution comprises bundling of service time across a wireless service and a wireline service, wherein applying the cross-contribution comprises:
   applying a wireline credit for unused wireline service time to a total wireless charge record;
   applying a wireless credit for unused wireless service time to a total wireline charge record.

2. The method of claim 1 wherein processing the plurality of wireless service events and the plurality of wireline service events further comprises:
   extracting the wireless service events generated during a billing period by a customer based on a customer identification; and
   extracting the wireline service events generated during the billing period by the customer based on the customer identification.

3. The method of claim 2 wherein processing the plurality of wireless service events and the plurality of wireline service events further comprises:
   determining the total wireless charge record for the extracted wireless service events; and
   determining the total wireline charge record for the extracted wireline service events.

4. The method of claim 3 wherein processing the plurality of wireless service events and the plurality of wireline service events together further comprises:
   determining if the extracted wireless service events are eligible for the cross-contribution;
   applying the cross-contribution to the extracted wireless service events eligible for the cross-contribution; and
   adjusting the total wireless charge record.

5. The method of claim 3 wherein processing the plurality of wireless service events and the plurality wireline service events together further comprises:
   determining if the extracted wireline service events are eligible for the cross-contribution;
   applying the cross-contribution to the extracted wireline service events eligible for the cross-contribution; and
   adjusting the total charge record for the extracted wireline service events.

6. The method of claim 1 wherein applying the cross-contribution comprises providing a discount to a customer based upon a total amount of service time accumulated across the wireless service and the wireline service.

7. A communication billing system comprising:
   a processing system configured to process a plurality of wireless service events together with a plurality of wireline service events to apply a cross-contribution, wherein to apply the cross-contribution the processing system is configured to apply a wireline credit for unused wireline service minutes to a total wireless charge record, and apply a wireless credit for unused wireless service minutes to a total wireline charge record;
   an interface system coupled to the processing system and configured to receive the plurality of wireless service events and receive the plurality of wireline service events for the processing system; and
   an event storage system configured to store the received plurality of wireline service events and the received plurality of wireless service events.

8. The communication billing system of claim 7 wherein the processing system is further configured to extract from the event storage system the wireless service events based on a customer identification and extract from the event storage system the wireline service events based on the customer identification.

9. The communication billing system of claim 8 wherein the processing system is further configured to determine the total wireless charge record and determine the total wireline charge record.

10. The communication billing system of claim 9 wherein the processing system is further configured to determine if the extracted wireless service events are eligible for the cross-contribution, apply the cross-contribution to the extracted wireless service events eligible for the cross-contribution, and adjust the total wireless charge record.

11. The communication billing system of claim 9 wherein the processing system is further configured to determine if the extracted wireline service events are eligible for the cross-contribution, apply the cross-contribution to the extracted wireline service events eligible for the cross-contribution, and adjust the total wireline charge record.

12. The communication billing system of claim 7 wherein the processing system is configured to apply a discount to a customer based upon a total amount of service time accumulated across the wireless service and wireline service.

13. A computer readable medium having encoded thereon software for a communication billing system, the software comprising:
   instructions operational when executed by a processing system to direct the processing system to receive a plurality of wireless service events and a plurality of wireline service events, and process the plurality of wireless service events and the plurality of wireline service events together to apply a cross-contribution wherein the cross-contribution comprises a wireline credit for unused wireline service minutes to a total wireless charge record and a wireless credit for unused wireless service minutes to a total wireline charge record.

14. The computer readable medium of claim 13 wherein the instructions are operational when executed by the processing system to direct the processing system to determine if the wireless service events are eligible for the cross-contribution, apply the cross-contribution to the wireless service events eligible for the cross-contribution, and adjust a total wireless charge record for the wireless service events.

15. The computer readable medium of claim 13 wherein the instructions are operational when executed by the processing system to direct the processing system to determine if the wireline service events are eligible for the cross-contribution, apply the cross-contribution to the wireline service events eligible for the cross-contribution, and adjust a total wireline charge record for the wireline service events.

16. The computer readable medium of claim 13 wherein the instructions are operational when executed by the processing system to direct the processing system to apply a discount based upon a total amount of service time accumulated across the wireless service and wireline service.

* * * * *